US008686835B2

(12) United States Patent
Goda (10) Patent No.: US 8,686,835 B2
(45) Date of Patent: Apr. 1, 2014

(54) BAGGAGE ARRANGEMENT MANAGEMENT METHOD AND CARRYING APPARATUS (75) Inventor: Makoto Goda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 13/064,658

(22) Filed: Apr. 6, 2011

(65) Prior Publication Data

US 2011/0181400 A1 Jul. 28, 2011

Related U.S. Application Data (63) Continuation of application No. PCT/JP2008/068676, filed on Oct. 15, 2008.

(51) Int. Cl.
H04Q 5/22 (2006.01)
(52) U.S. Cl.
USPC ........................................ 340/10.4
(58) Field of Classification Search
USPC .................. 340/10.41, 10.5, 12.5, 572.4, 505
See application file for complete search history.

(56) References Cited

U.S. PATENT DOCUMENTS

| 6,842,121 | B1 * | 1/2005 | Tuttle | 340/693.9 |
| 6,970,088 | B2 * | 11/2005 | Kovach | 340/572.1 |
| 7,030,760 | B1 * | 4/2006 | Brown | 340/568.1 |
| 7,916,025 | B2 * | 3/2011 | Locker et al. | 340/572.1 |

FOREIGN PATENT DOCUMENTS

| JP | 09-231428 | 9/1997 |
| JP | 2001-225915 | 8/2001 |
| JP | 2001-228799 | 8/2001 |
| JP | 2007-112523 | 5/2007 |
| JP | 2007-233884 | 9/2007 |
| JP | 2007-276992 | 10/2007 |
| JP | 2008-234010 | 10/2008 |

OTHER PUBLICATIONS

Japanese Office Action issued Oct. 23, 2012 in corresponding Japanese Patent Application No. 2010-533754.

* cited by examiner

Primary Examiner — Vernal Brown
(74) Attorney, Agent, or Firm — Staas & Halsey LLP (57) ABSTRACT A baggage arrangement management method includes acquiring information for identifying a collection place of an arrangement destination from a RFID tag of an arrangement target piece of baggage, acquiring information for identifying a collection place at which baggage is arranged from an RFID tag of the piece of baggage lastly arranged at the collection place, and comparing the two pieces of information to confirm the collection place. Information of identifying each piece of baggage arranged at the collection place is cumulatively recorded in the RFID tags of the subsequent pieces of baggage arranged next to the place.

9 Claims, 8 Drawing Sheets

BAGGAGE ARRANGEMENT MANAGEMENT METHOD AND CARRYING APPARATUS

CROSS-REFERENCE TO RELATED APPLICATION

This application is a continuation of International Application No. PCT/JP2008/068676, filed on Oct. 15, 2008, the entire contents of which are incorporated herein by reference.

FIELD

The embodiment discussed herein are directed to a baggage arrangement management method for managing arrangement of baggage in a collection place, and a carrying apparatus.

BACKGROUND

Conventionally, a technique of managing arrangement of baggage in a warehouse using a radio frequency identification (RFID) tag has been known. For example, a technique of attaching an RFID tag storing information for identifying a collection place of a baggage to a rack of the collection place and confirming the collection place of the baggage by reading the contents of the RFID tag through a reader/writer installed in a carrying apparatus such as a forklift has been known.

However, there has been a case in which arrangement of baggage could not accurately be managed even if the above described conventional baggage arrangement management technique is used. For example, when a piece of baggage is flatly placed, since another piece of baggage already placed becomes an obstacle, the content of the RFID tag attached to the rack of the collection place cannot be read by the reader/writer, so the baggage may be placed at a wrong place.

Further, there have been cases in which since another piece of baggage became an obstacle, the content of the RFID tag attached to the baggage placed at the collection place could not be read by the read/writer, so it became impossible to grasp what each piece of baggage.

Patent Document: Japanese Laid-open Patent Publication No. 2007-112523.

SUMMARY

According to an aspect of an embodiment of the invention, a carrying apparatus for carrying a baggage to arrange the baggage at a collection place, includes an arrangement target baggage information reading unit that reads collection place identification information for identifying a collection place of an arrangement destination of a first piece of baggage from a tag attached to the first piece of baggage that is baggage of an arrangement target; a collection place information reading unit that reads collected baggage identification information and collection place identification information from a tag attached to a second piece of baggage that is baggage lastly arranged in a collection place, the collected baggage identification information including baggage identification information for identifying each piece of baggage arranged in a collection place at which the second piece of baggage is arranged, the collection place identification information being for identifying the collection place at which the second piece of baggage is arranged; a collection place confirmation unit that compares the collection place identification information read by the arrangement target baggage information reading unit with the collection place identification information read by the collection place information reading unit and confirms that the collection place of the arrangement destination of the first piece of baggage is the same as the collection place in which the second piece of baggage is arranged; and a recording unit that records collected baggage identification information read from a tag attached to the second piece of baggage in a tag attached to the first baggage when the collection place confirmation unit confirms that the collection place of the arrangement destination of the first piece of baggage is the same as the collection place in which the second piece of baggage is arranged.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The invention is not limited to the embodiments.

Figure 8:
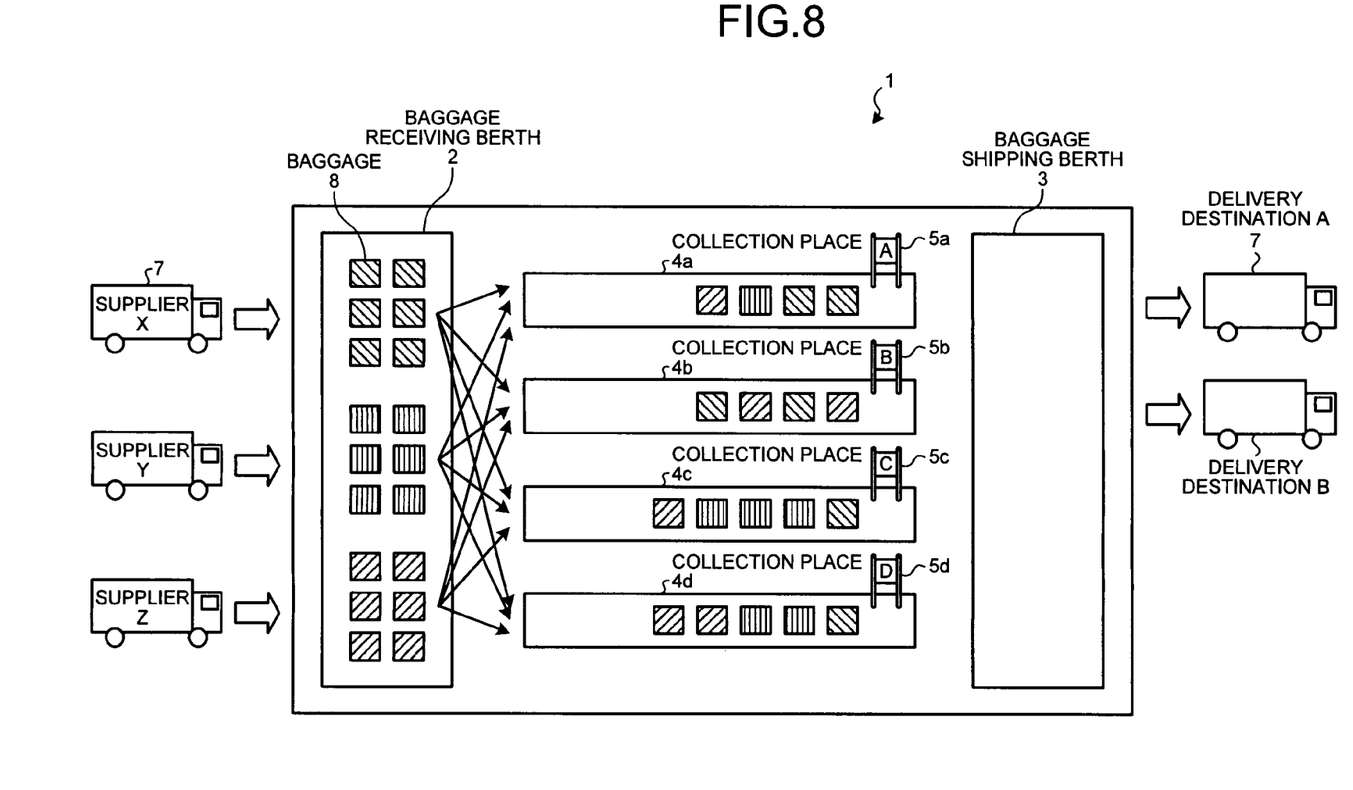
FIG. 8 is a diagram illustrating a delivery center to which a baggage arrangement management method according to the embodiment is applied.

First, an example of a delivery center to which a baggage arrangement management method according to an embodiment can be applied will be described. FIG. 8 is a diagram illustrating a delivery center 1 to which a baggage arrangement management method according to the present embodiment is applied. The delivery center 1 is a facility that collects pieces of baggage received from a plurality of suppliers and ships the baggage to each delivery destination. The delivery center 1 includes a baggage receiving berth 2, a baggage shipping berth 3, and collection places 4a to 4d.

The baggage receiving berth 2 is an area on which pieces of baggage 8 carried from suppliers X to Z are unloaded from trucks 7 and temporarily placed. The trucks 7 are load with pieces of baggage 8 to be delivered to a plurality of destinations, and the baggage 8 placed on the baggage receiving berth 2 is arranged at a place corresponding to the delivery destination among the collection places 4a to 4d.

The baggage shipping berth 3 is an area on which the baggage 8 collected on the collection places 4a to 4d according to each delivery destination is temporarily placed for shipment. The baggage 8 placed on the baggage shipping berth 3 is loaded on the truck 7 and delivered to each delivery destination.

Each of the collection places 4a to 4d corresponds to one delivery destination and is an area on which the baggage 8 to be delivered to a corresponding delivery destination is collected. Labels 5a to 5d for identifying respective places are provided at the collection places 4a to 4d. That is, the label 5a representing the place to receive baggage for a delivery destination A is installed at the collection place 4a. Similarly, the labels 5b to 5d representing places to receive pieces of baggage for destinations B to D are installed at the collection places 4b to 4d.

At the collection places 4a to 4d, pieces of baggage 8 to be delivered to the corresponding delivery destinations are arranged in line behind the corresponding labels 5a to 5d. For this reason, when a plurality of pieces of baggage 8 is placed at the collection places 4a to 4d, a position at which a new baggage 8 is to be placed becomes far away from the labels 5a to 5d. Thus, a worker may misread the labels 5a to 5d and place the baggage 8 at a wrong place. Such a wrong arrangement causes a serious problem such as erroneous delivery or omission of delivery.

Further, when such a wrong arrangement happens, even if the wrong arrangement is detected before shipment, it may be difficult to find the baggage 8 that is wrongly arranged. In order to effectively use the place, pieces of baggage 8 are arranged at the collection places 4a to 4d at a narrow interval. For this reason, if a slip or an RFID tag that represents an identification number of a piece of the baggage 8 is attached to the surface facing another piece of baggage 8, the worker cannot check the content of the slip or the RFID tag and cannot detect the baggage that is wrongly arranged.

Next, a baggage arrangement management method according to the present embodiment will be described. The baggage arrangement management method according to the present embodiment resolves the above problems by using an RFID tag 9 attached to the baggage 8 lastly arranged at each collection place 4.

Figure 1:
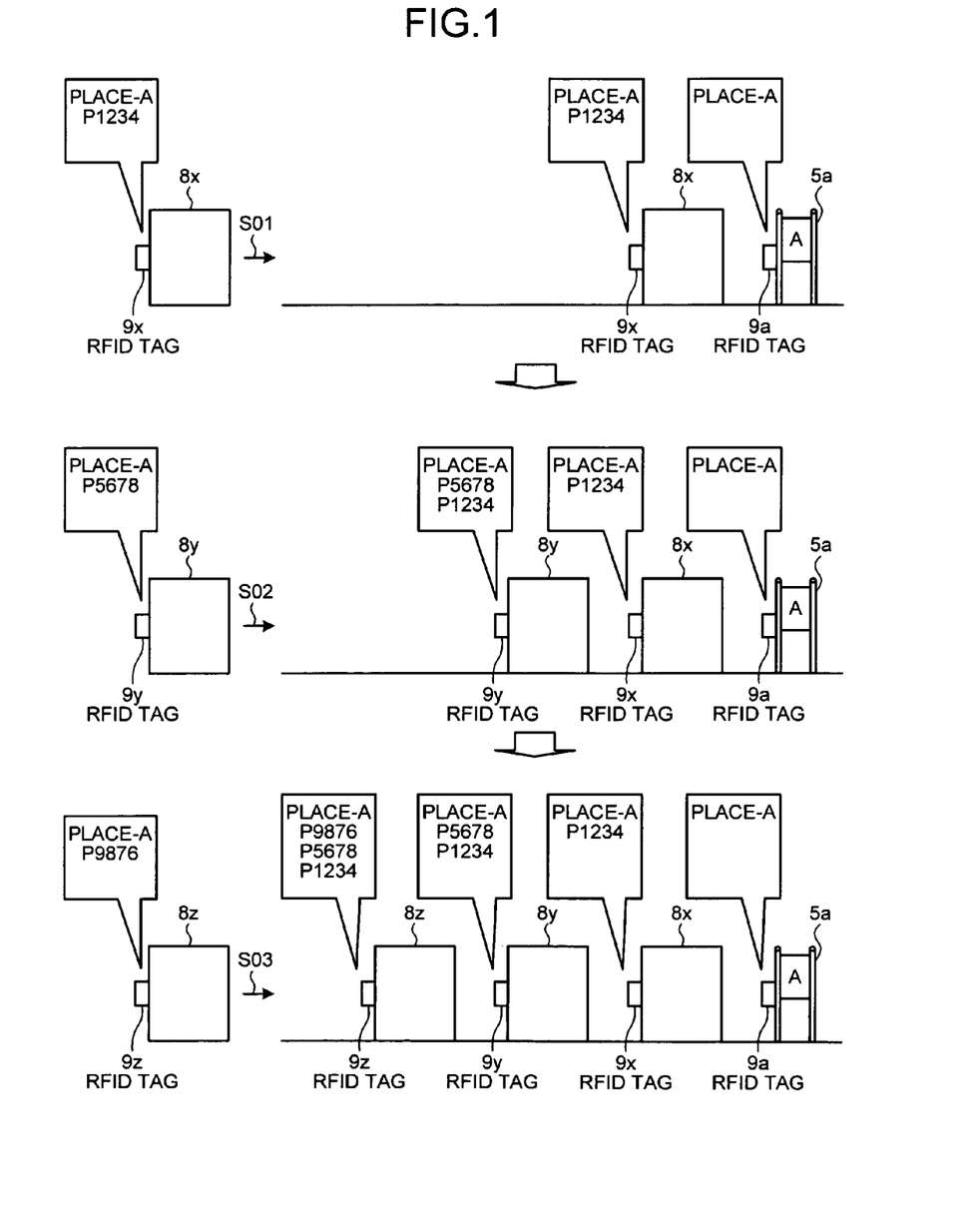
FIG. 1 is a diagram for explaining a baggage arrangement management method according to an embodiment.

FIG. 1 is a diagram for explaining the baggage arrangement management method according to the present embodiment. FIG. 1 illustrates an aspect in which the baggage 8 is collected on the collection place 4a. As illustrated in FIG. 1, an RFID tag 9a is attached to the label 5a for identifying the collection place 4a. "PLACE-A" is previously stored in the RFID tag 9a as collection place identification information for identifying the collection place 4a.

The collection place identification information refers to information for identifying a place at which the baggage is to be arranged. For example, when pieces of baggage of each final destination (delivery destination) are arranged together, information representing the final destination may be regarded as the collection place identification information.

Further, an RFID tag 9x is attached to a piece of baggage 8x arranged at the collection place 4a. In the RFID tag 9x, "PLACE-A" is previously stored as a collection place identification number representing a place at which the baggage 8x is to be collected, and "P1234" is previously stored as a baggage identification number for identifying the baggage 8x.

Similarly, an RFID tag 9y is attached to a piece of baggage 8y arranged at the collection place 4a. In the RFID tag 9y, "PLACE-A" is previously stored as the collection place identification number, and "P5678" is previously stored as the baggage identification number. Further, an RFID tag 9z is attached to a baggage 8z arranged at the collection place 4a. In the RFID tag 9z, "PLACE-A" is previously stored as the collection place identification number, and "P9876" is previously stored as the baggage identification number.

In step of initially arranging the baggage 8x at the collection place 4a (step S01), information stored in the RFID tag 9a and information stored in the RFID tag 9x are read by a reader/writer. The collection place identification number ("PLACE-A") stored in the RFID tag 9a and the collection place identification number ("PLACE-A") stored in the RFID tag 9x are compared with each other.

If the collection place identification numbers do not match, since it means that a place at which the baggage 8x is to be arranged is a wrong place, the baggage 8x is moved to another collection place 4. In the example of FIG. 1, since the collection place identification numbers do match, it is confirmed by the comparison that a place at which the baggage 8x is to be arranged is a correct place, and the baggage 8x is placed near the label 5a.

Further, if the collection place identification numbers match, collected baggage identification information included in information read from another RFID tag 9 is recorded in the RFID tag 9 of the baggage 8 that is newly arranged. The collected baggage identification information refers to information that includes all of the baggage identification numbers for identifying the baggage 8 placed on the current collection place 4. Specifically, in the present embodiment, information in which the collection place identification number is excluded from information stored in each RFID tag 9 of the collected baggage 8 corresponds to the collected baggage identification information.

In this example, the collected baggage identification information included in information read from the RFID tag 9a is recorded in the RFID tag 9x. However, since the collected baggage identification number included in information read from the RFID tag 9a is empty, nothing is actually recorded in the RFID tag 9x.

As a result, after completion of the arrangement of the baggage 8x, "P1234" as well as "PLACE-A" that is the collection place identification number are stored in the RFID tag 9x of the baggage 8x positioned at the end of the collection place 4a. Thus, in the RFID tag 9x, "P1234" corresponds to the collected baggage identification information. The collected baggage identification information includes all of the baggage identification numbers for identifying each piece of baggage 8 collected on the collection place 4a with certainty.

Subsequently, in step of arranging the baggage 8y at the collection place 4a (step S02), information stored in the RFID tag 9x of the baggage 8x arranged at the end of the collection place 4a and information stored in the RFID tag 9y are read by the reader/writer. The collection place identification number ("PLACE-A") stored in the RFID tag 9x and the collection place identification number ("PLACE-A") stored in the RFID tag 9y are compared with each other.

If the collection place identification numbers do not match, since it means that a place at which the baggage 8y is to be arranged is a wrong place, the baggage 8y is moved to another collection place 4. In the example of FIG. 1, since the collection place identification numbers match, it is confirmed by the comparison that a place at which the baggage 8y is to be arranged is a correct place, and the baggage 8y is placed behind the baggage 8x.

By comparing the collection place identification number of the baggage 8y that is newly arranged with the collection place identification number of the baggage 8x arranged at the end as described above, even when the baggage 8y is placed at a place far from the label 5a, it is possible to confirm that the arrangement place is not wrong with certainty.

In this case, since the collection place identification numbers match, the collected baggage identification information included in information read from the RFID tag 9x is recorded in the RFID tag 9y. Specifically, in this case, "P1234" is recorded in the RFID tag 9y.

As a result, after completion of the arrangement of the baggage 8y, "P5678" and "P1234" as well as "PLACE-A" that are the collection place identification number are stored in the RFID tag 9y of the baggage 8y positioned at the end of the collection place 4a. Thus, in the RFID tag 9y, "P5678" and "P1234" correspond to the collected baggage identification information. The collected baggage identification information includes all of the baggage identification numbers for identifying each piece of baggage 8 collected on the collection place 4a with certainty.

Further, when a plurality of baggage identification numbers is recorded in the RFID tag 9, it is necessary to specify which baggage identification number is the baggage identification number of the baggage 8 corresponding to the RFID tag 9. The specifying is done according to a format of information recorded in the RFID tag 9. For example, in the example of FIG. 1, the baggage identification number at the front of the collected baggage identification information is specified as the baggage identification number of the baggage 8 corresponding to the RFID tag 9.

Subsequently, in step of arranging the baggage 8z at the collection place 4a (step S03), information stored in the RFID tag 9z of the baggage 8z arranged at the end of the collection place 4a and information stored in the RFID tag 9z are read by the reader/writer. The collection place identification number ("PLACE-A") stored in the RFID tag 9y and the collection place identification number ("PLACE-A") stored in the RFID tag 9z are compared with each other.

If the collection place identification numbers do not match, since it means that a place at which the baggage 8z is to be arranged is a wrong place, the baggage 8z is moved to another collection place 4. In the example of FIG. 1, since the collection place identification numbers match, it is confirmed by the comparison that a place at which the baggage 8z is to be arranged is a correct place, and the baggage 8z is placed behind the baggage 8y.

In this case, since the collection place identification numbers match, the collected baggage identification information included in information read from the RFID tag 9y is recorded in the RFID tag 9z. Specifically, in this case, "P5678" and "P1234" are recorded in the RFID tag 9z.

As a result, after completion of the arrangement of the baggage 8z, "P9876", "P5678", and "P1234" as well as "PLACE-A" that are the collection place identification number are stored in the RFID tag 9z of the baggage 8z positioned at the end of the collection place 4a. Thus, in the RFID tag 9z, "P9876", "5678", and "P1234" correspond to the collected baggage identification information. The collected baggage identification information includes all of the baggage identification numbers for identifying each piece of baggage 8 collected on the collection place 4a with certainty.

As described above, in the baggage arrangement management method according to the present embodiment, the collected baggage identification information is cumulatively recorded in the RFID tag 9 of the consecutive baggage 8 arranged at the same collection place 4. For this reason, by reading the collected baggage identification information recorded in the RFID tag 9 that is lastly arranged, it is possible to recognize the baggage 8 arranged at the collection place 4 without reading the RFID tag 9 of another piece of baggage 8.

Thus, even when a certain piece of baggage 8 is arranged at a wrong collection place 4 due to a specific reason and thus it is necessary to find the certain piece of baggage 8 among pieces of baggage 8 that are already arranged, the corresponding baggage 8 can be easily found.

Further, various management jobs such as inventory management can be conducted using the collected baggage identification information recorded in the RFID tag 9 of the baggage 8 that is lastly arranged. As an example of the management jobs, an example of performing shipment management using the collected baggage identification information will be described later.

In the example of FIG. 1, a number written in the RFID tag 9 is used as the baggage identification number, but an ID specific to the RFID tag 9 may be used as the baggage identification number. A case of using an ID specific to the RFID tag 9 as the baggage identification number will be described with reference to FIG. 2.

Figure 2:
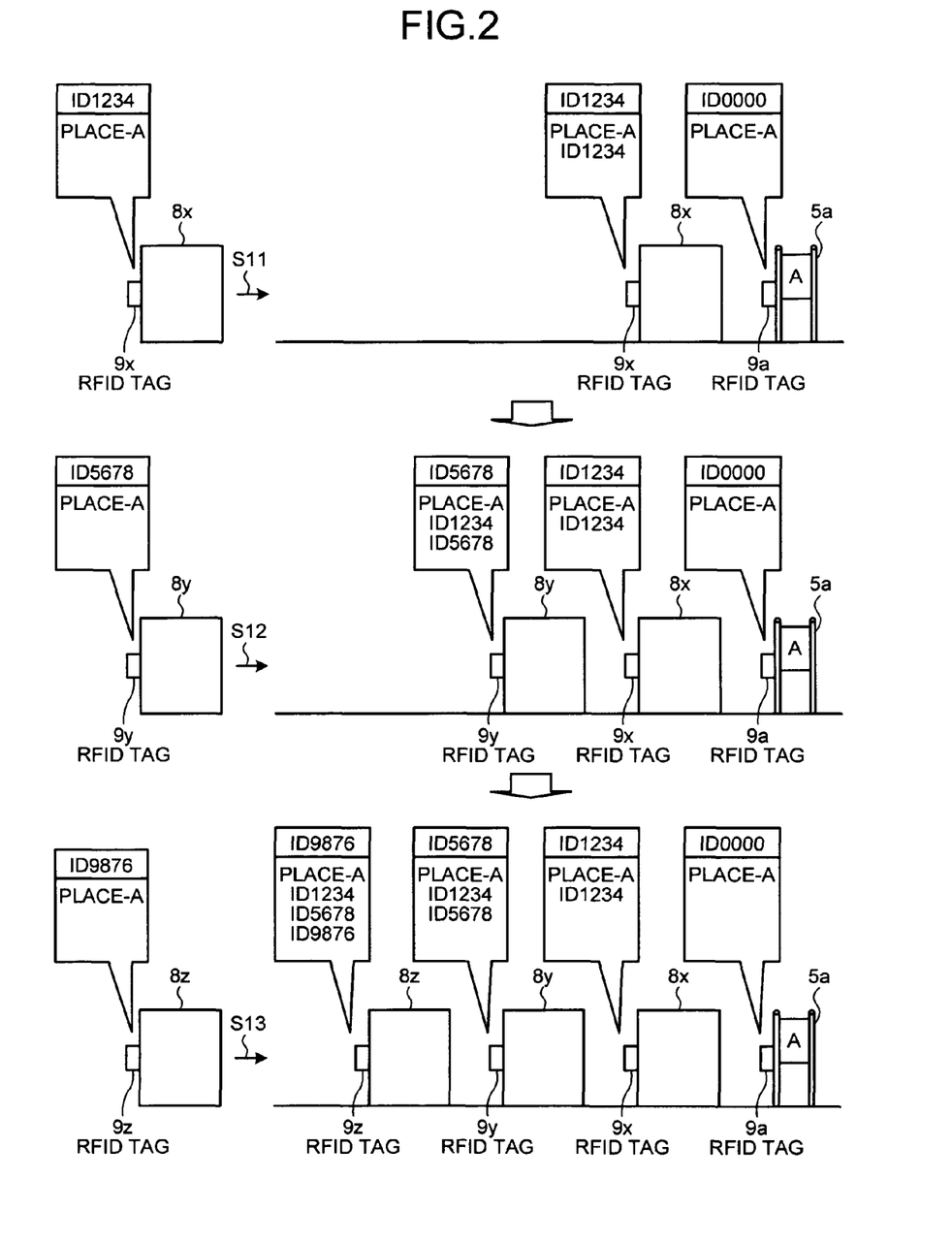
FIG. 2 is a diagram illustrating a modification of the baggage arrangement management method according to the embodiment.

As illustrated in FIG. 2, an RFID tag, 9a having "ID0000" as its ID is attached to the label 5a for identifying the collection place 4a. "PLACE-A" is previously stored in the RFID tag 9a as the collection place identification information.

Further, an RFID tag 9x having "ID1234" as its ID is attached to the baggage 8x arranged at the collection place 4a, and "PLACE-A" is previously stored in the RFID tag 9x, as the collection place identification number.

Similarly, an RFID tag 9y having "ID5678" as its ID is attached to the baggage 8y arranged at the collection place 4a, and "PLACE-A" is previously stored in the RFID tag 9y as the collection place identification number.

Further, an RFID tag 9z having "ID9876" as its ID is attached to the baggage 8z arranged at the collection place 4a. "PLACE-A" is previously stored in the RFID tag 9z as the collection place identification number.

In step of initially arranging the baggage 8x at the collection place 4a (step S11), information stored in the RFID tag 9a and information stored in the RFID tag 9x are read by the reader/writer together with the IDs thereof. The collection place identification number ("PLACE-A") stored in the RFID tag 9a and the collection place identification number ("PLACE-A") stored in the RFID tag 9x are compared with each other.

If the collection place identification numbers do not match, since it means that a place at which the baggage 8x is to be arranged is a wrong place, the baggage 8x is moved to another collection place 4. In the example of FIG. 2, since the collection place identification numbers match, it is confirmed by the comparison that a place at which the baggage 8x is to be arranged is a correct place, and the baggage 8x is placed near the label 5a.

Further, if the collection place identification numbers match, the collected baggage identification information included in information read from another RFID tag 9 is recorded in the RFID tag 9 of the baggage 8 that is newly arranged together with the ID of the RFID tag 9 of the baggage 8 that is newly arranged.

In this example, the collected baggage identification information included in information read from the RFID tag 9a is recorded in the RFID tag 9x together with the ID of the RFID tag 9x. However, since the collected baggage identification number included in information read from the RFID tag 9a is empty, "ID1234" that is the ID of the RFID tag 9x is recorded in the RFID tag 9x.

As a result, after completion of the arrangement of the baggage 8x, "ID1234" as well as "PLACE-A" that are the collection place identification number is stored in the RFID tag 9x of the baggage 8x positioned at the end of the collection place 4a. Thus, in the RFID tag 9x, "ID1234" corresponds to the collected baggage identification information. The collected baggage identification information includes all of the baggage identification numbers for identifying each piece of baggage 8 collected on the collection place 4a with certainty.

Subsequently, in step of arranging the baggage 8y at the collection place 4a (step S12), information stored in the RFID tag 9x of the baggage 8x and information stored in the RFID tag 9y are read by the reader/writer together with the IDs thereof. The collection place identification number ("PLACE-A") stored in the RFID tag 9x and the collection place identification number ("PLACE-A") stored in the RFID tag 9y are compared with each other.

If the collection place identification numbers do not match, since it means that a place at which the baggage 8y is to be arranged is a wrong place, the baggage 8y is moved to another collection place 4. In the example of FIG. 2, since the collection place identification numbers match, it is confirmed by the comparison that a place at which the baggage 8y is to be arranged is a correct place, and the baggage 8y is placed behind the baggage 8x.

In this case, since the collection place identification numbers match, the collected baggage identification information included in information read from the RFID tag 9x is recorded in the RFID tag 9y together with the ID of the RFID tag 9y. Specifically, in this case, "ID1234" and "ID5678" are recorded in the RFID tag 9y.

As a result, after completion of the arrangement of the baggage 8y is completed, "ID1234" and "ID5678" as well as "PLACE-A" that are the collection place identification number are stored in the RFID tag 9y of the baggage 8y positioned at the end of the collection place 4a. Thus, in the RFID tag 9y, "ID1234" and "ID5678" correspond to the collected baggage identification information. The collected baggage identification information includes all of the baggage identification numbers for identifying each piece of baggage 8 collected on the collection place 4a with certainty.

Subsequently, in step of arranging the baggage 8z at the collection place 4a (step S13), information stored in the RFID tag 9z of the baggage 8z and information stored in the RFID tag 9z are read by the reader/writer together with the IDs thereof. The collection place identification number ("PLACE-A") stored in the RFID tag 9y and the collection place identification number ("PLACE-A") stored in the RFID tag 9z are compared with each other.

If the collection place identification numbers do not match, since it means that a place at which the baggage 8z is to be arranged is a wrong place, the baggage 8z is moved to another collection place 4. In the example of FIG. 2, since the collection place identification numbers match, it is confirmed by the comparison that a place at which the baggage 8z is to be arranged is a correct place, and the baggage 8z is placed behind the baggage 8y.

In this case, since the collection place identification numbers match, the collected baggage identification information included in information read from the RFID tag 9y is recorded in the RFID tag 9z together with the ID of the RFID tag 9z. Specifically, in this case, "ID1234", "ID5678", and "ID9876" are recorded in the RFID tag 9z.

As a result, after completion of the arrangement of the baggage 8z, "ID1234", "ID5678", and "ID9876" as well as "PLACE-A" that are the collection place identification number are stored in the RFID tag 9z of the baggage 8z positioned at the end of the collection place 4a. Thus, in the RFID tag 9z, "ID1234", "ID5678", and "ID9876" correspond to the collected baggage identification information. The collected baggage identification information includes all of the baggage identification numbers for identifying each piece of baggage 8 collected on the collection place 4a with certainty.

As described above, even when the ID specific to the RFID tag 9 is used as the baggage identification number, the baggage arrangement management method according to the present embodiment can be implemented. Further, the below description will be made under the assumption that the baggage arrangement management method is implemented by the method illustrated in FIG. 1.

Next, a configuration of a carrying apparatus that executes a baggage arrangement management method according to the present embodiment will be described. Here, as an example of a carrying apparatus, the configuration of a forklift will be described, but a baggage arrangement management method according to the present embodiment can be implemented by any other carrying apparatus such as a crane.

Figure 3:
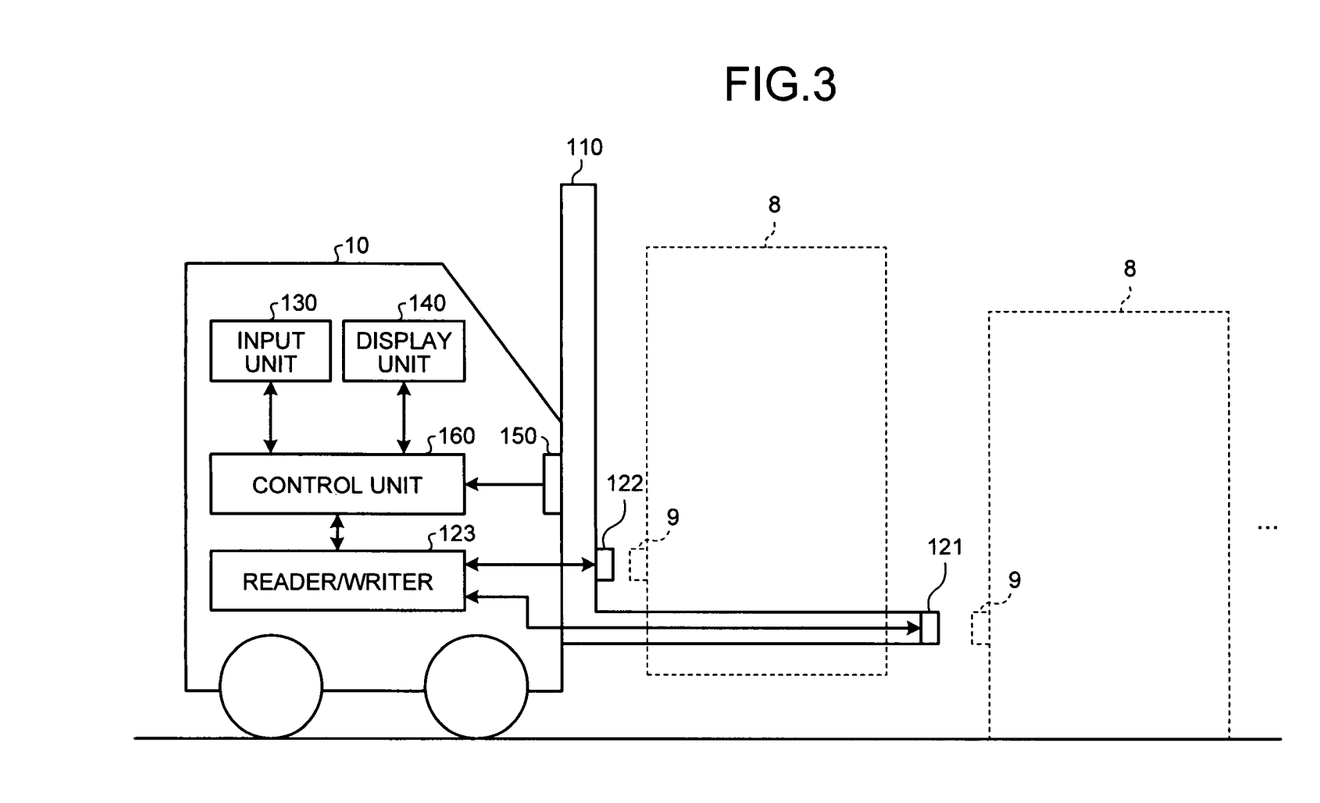
FIG. 3 is a diagram illustrating the configuration of a forklift that executes the baggage arrangement management method according to the embodiment.

FIG. 3 is a diagram illustrating the configuration of a forklift 10 that executes a baggage arrangement management method according to the present embodiment. As illustrated in FIG. 3, the forklift 10 includes a fork unit 110, antennas 121 and 122, a reader/writer 123, an input unit 130, a display unit 140, a baggage detection unit 150, and a control unit 160.

The fork unit 110 is a movable unit that moves the baggage 8 up and down. The fork unit 110 has a fork that extends in a horizontal direction and makes the fork enter below a container or a pallet and lifts the container or the pallet up.

The antennas 121 and 122 are antennas for executing reading/writing of information from/to the RFID tag 9. The antenna 121 is installed at the front of the fork of the fork unit 110 and used to execute reading/writing of information from/to the RFID tag 9 attached to the collected baggage 8 or a label 5 during carrying of the baggage 8. The antenna 122 is installed near the base of the fork of the fork unit 110 and used to execute reading/writing of information from/to the RFID tag 9 attached to the baggage 8 that is being carried during carrying of the baggage 8.

In order to enable the antennas 121 and 122 to accurately execute reading/writing of information from/to the RFID tag 9, the RFID tag 9 is preferably attached at almost the same height as the height of the antenna 121 of the forklift 10 that is carrying the baggage. Further, the antenna 122 is preferably installed at almost the same height as the RFID tag 9 attached to the baggage 8 that is being carried.

The reader/writer 123 executes reading/writing of information from/to the RFID tag 9 through the antennas 121 and 122. Further, one reader/writer may be installed for each of the antennas 121 and 122.

The input unit 130 is an input device through which a worker who operates the forklift 10 enters an instruction. The display unit 140 is a display device that displays information to the worker who operates the forklift 10. The baggage detection unit 150 is a device that detects whether or not the baggage 8 is loaded onto the fork unit 110 and corresponds to a weight sensor or a pressure sensor.

Figure 4:
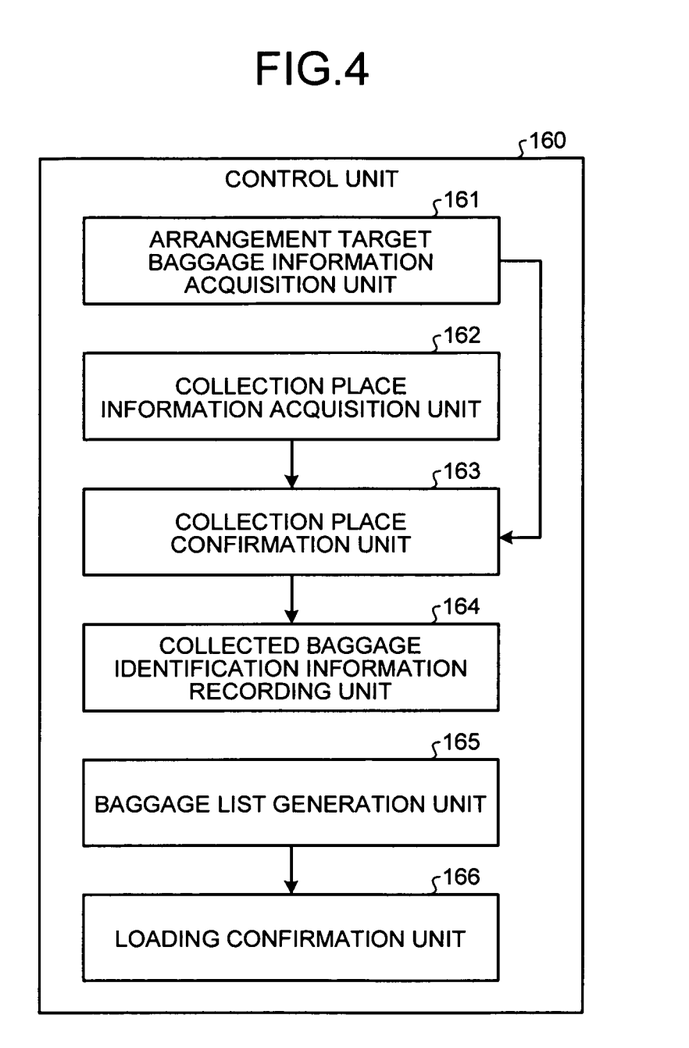
FIG. 4 is a block diagram illustrating the configuration of a control unit.

The control unit 160 is a control unit that executes various control for implementing a baggage arrangement management method according to the present embodiment. The control unit 160 includes an arrangement target baggage information acquisition unit 161, a collection place information acquisition unit 162, a collection place confirmation unit 163, a collected baggage identification information recording unit 164, a baggage list generation unit 165, and a loading confirmation unit 166.

The arrangement target baggage information acquisition unit 161 acquires information stored in the RFID tag 9 attached to an arrangement target baggage 8. Specifically, the arrangement target baggage information acquisition unit 161 is triggered when the baggage detection unit 150 detects that the baggage 8 is loaded onto the fork unit 110 to acquire information read from the RFID tag 9 through the antenna 122.

The collection place information acquisition unit 162 acquires information that is stored in the label 5 installed at the collection place 4 or in the RFID tag 9 attached to the baggage 8 lastly arranged at the collection place 4. Specifically, the collection place information acquisition unit 162 is triggered when the RFID tag 9 is detected through the antenna 121 to acquire information read from the RFID tag 9 through the antenna 121.

The collection place confirmation unit 163 compares the collection place identification number included in the information acquired by the arrangement target baggage information acquisition unit 161 with the collection place identification number included in the information acquired by the collection place information acquisition unit 162. When the two collection place identification numbers do not match, the collection place confirmation unit 163 displays information representing that the collection place 4 is a wrong place on the display unit 140. However, when the two collection place identification numbers match, the collection place confirmation unit 163 displays information representing that the collection place 4 is a correct place on the display unit 140.

The collected baggage identification information recording unit 164 executes a process of recording the collected baggage identification information when the two collection place identification numbers compared by the collection place confirmation unit 163 match. Specifically, the collected baggage identification information recording unit 164 is triggered when the baggage detection unit 150 detects that the baggage 8 is unloaded to record the collected baggage identification information included in the information acquired by the collection place information acquisition unit 162 in the RFID tag 9 through the antenna 122.

By the recording, the collected baggage identification information including all of the baggage identification numbers of pieces of baggage 8 arranged at the collection place 4 is stored in the RFID tag 9 of the baggage 8 lastly arranged at the collection place 4. Further, the reason why the recording is executed after unloading of the baggage 8 is detected is because, for example, when a plurality of rows is formed on at the collection place 4 and each row is independently managed, a row on which the baggage 8 being carried is to be arranged at the end thereof is not decided until the baggage is placed.

The baggage list generation unit 165 generates a list of pieces of baggage 8 arranged at the collection place 4 based on the collected baggage identification information included in the information read by the RFID tag 9 of the baggage 8 lastly arranged at the collection place 4 through the antenna 121. The loading confirmation unit 166 executes a shipment process based on the list generated by the baggage list generation unit 165.

Figure 5:
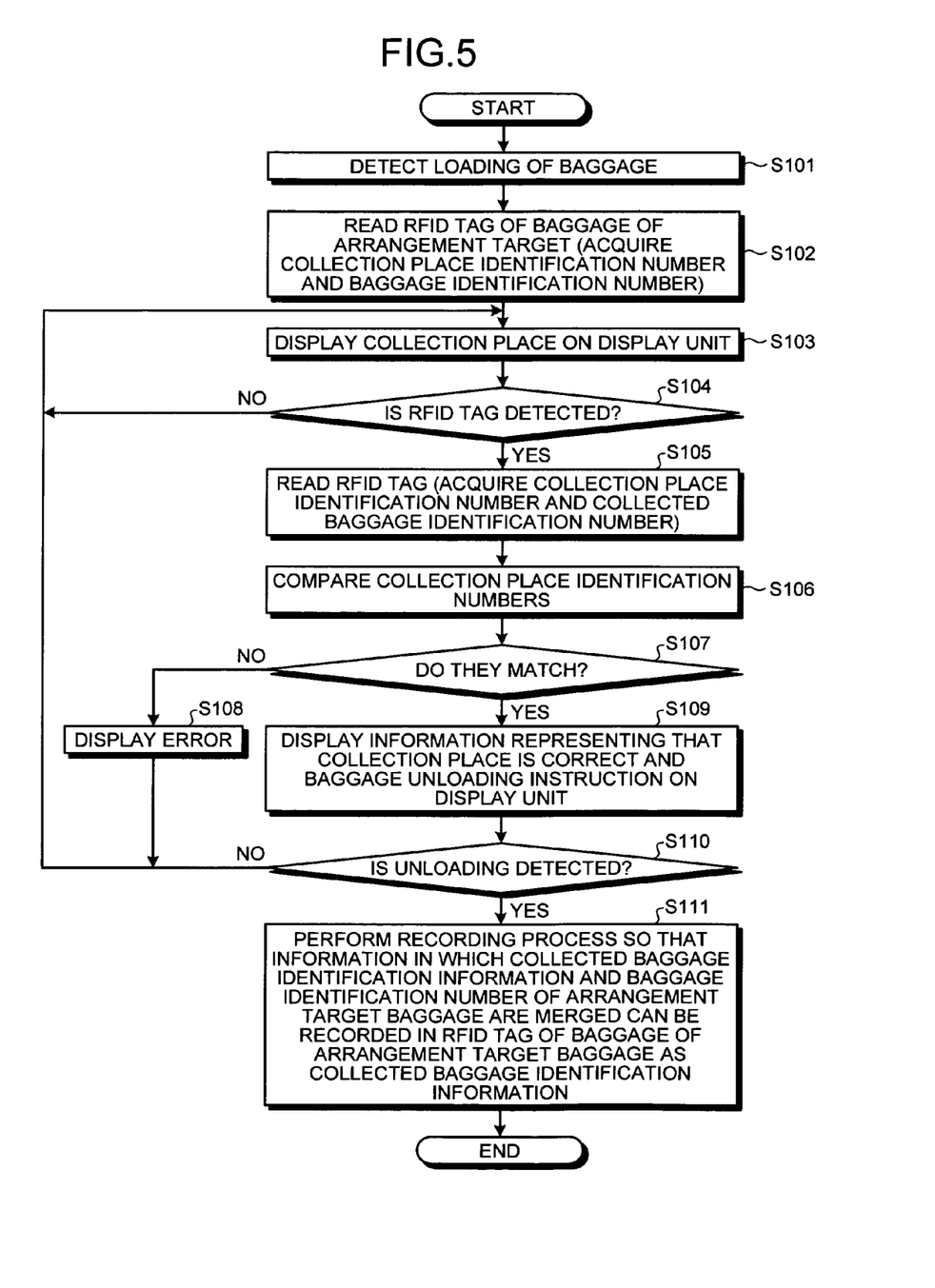
FIG. 5 is a flowchart illustrating a processing procedure of a process executed by a forklift when baggage is received.

Next, an operation of the forklift 10 illustrated in FIG. 3 will be described. FIG. 5 is a flowchart illustrating a processing procedure of a process executed by the forklift 10 when the baggage 8 is received. As illustrated in FIG. 5, when the baggage detection unit 150 detects that the baggage 8 is loaded (step S101), the arrangement target baggage information acquisition unit 161 acquires information stored in the RFID tag 9 attached to the loaded baggage 8 (step S102). As a result, the collection place identification number and the baggage identification number of the arrangement target baggage 8 are acquired.

Subsequently, the control unit 160 displays information representing the collection place corresponding to the collection place identification number acquired in step S102 on the display unit 140 and urges movement to the collection place 4 (step S103).

It is on standby until the RFID tag 9 is detected through the antenna 121, and when the RFID tag 9 is detected (Yes in step S104), the collection place information acquisition unit 162 acquires information read from the RFID tag 9 through the antenna 121 (step S105). As a result, the collection place identification number of the current place and the collected baggage identification number are acquired.

Subsequently, the collection place confirmation unit 163 compares the collection place identification number acquired in step S102 with the collection place identification number acquired in step S105 (step S106). When the two collection place identification numbers do not match (No in step S107), the collection place confirmation unit 163 displays information representing that the collection place 4 is a wrong place on the display unit 140 (step S108), and the process returns to step S103.

However, the two collection place identification numbers match (Yes in step S107), the collection place confirmation unit 163 displays information representing that the collection place 4 is a correct place and an unloading instruction on the display unit 140 (step S109). The collected baggage identification information recording unit 164 waits for a predetermined time until unloading of the baggage 8 is detected. When unloading is detected (Yes in step S110), the collected baggage identification information recording unit 164 executes the recording process on the RFID tag 9 of the baggage 8 that has been loaded (step S111). Specifically, the collected baggage identification information recording unit 164 executes the recording process so that information in which the baggage identification number acquired in step S102 and the collected baggage identification information acquired in step S105 are merged can be stored as new collected baggage identification information.

If unloading is not detected even though it is on standby for the predetermined time (No in step S110), the process returns to step S103.

Figure 6:
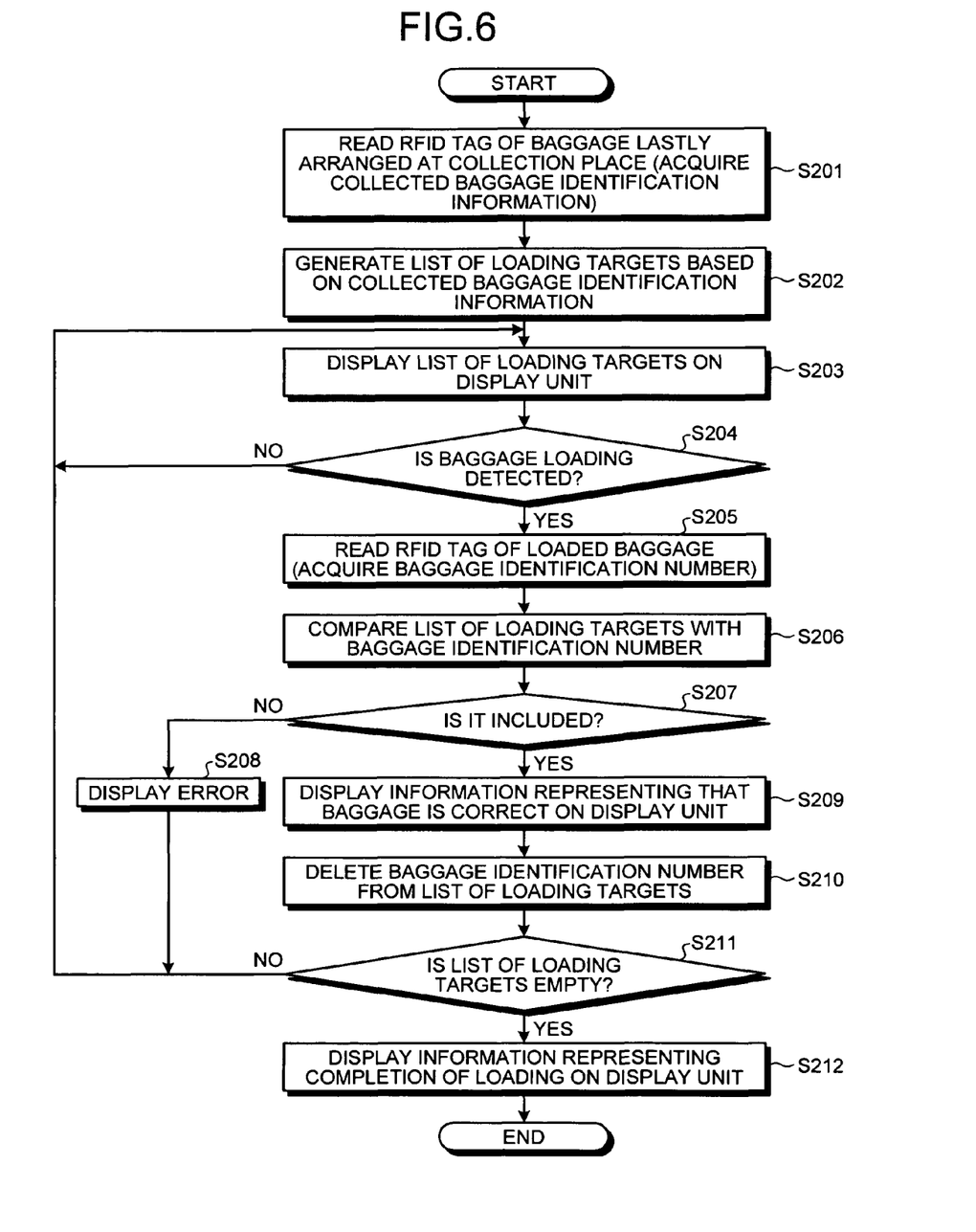
FIG. 6 is a flowchart illustrating a processing procedure of a process executed by a forklift when baggage is shipped.

FIG. 6 is a flowchart illustrating a processing procedure of a process executed by the forklift 10 when the baggage 8 is shipped. As illustrated in FIG. 6, the baggage list generation unit 165 acquires information stored in the RFID tag 9 lastly arranged at the collection place 4 at which the shipment target baggage 8 is collected (step S201). As a result, the collected baggage identification information is acquired.

The baggage list generation unit 165 extracts all of the baggage identification numbers included in the acquired collected baggage identification information and generates a loading target list (step S202). The loading target list refers to a list of the baggage identification numbers of pieces of baggage 8 to be loaded onto a certain truck 7.

Subsequently, the loading confirmation unit 166 displays the loading target list on the display unit 140 and urges the baggage 8 present in the loading target list to be loaded onto the truck 7 (step S203). It is on standby until the baggage 8 is loaded, and if the baggage detection unit 150 detects that the baggage 8 has been loaded (Yes in step S204), the loading confirmation unit 166 acquires information stored in the RFID tag 9 of the loaded baggage 8 (step S205). As a result, the baggage identification number for identifying the loaded baggage 8 is acquired.

The baggage 8 may be loaded onto the truck 7 in order starting from one at the front of the collection place 4 or one at the end of the collection place 4. When the baggage 8 is loaded onto the truck 7 in order starting from one at the front of the collection place 4, the forklift 10 lifts the baggage 8 up starting from one at a side opposite to the example illustrated in FIG. 3, that is, a side to which the RFID tag 9 is not attached. In this case, information of the RFID tag 9 is read through the antenna 121 installed near the front of the fork. Further, when the baggage 8 is loaded onto the truck 7 starting from one at the end of the collection place 4, the forklift 10 lifts the baggage 8 up, starting from one at the same side as in the example illustrated in FIG. 3, that is, a side to which the RFID tag 9 is attached. In this case, information of the RFID tag 9 is read through the antenna 122.

Subsequently, the loading confirmation unit 166 compares the loading target list with the acquired baggage identification number (step S206). If the baggage identification number is not included in the loading target list (No in step S207), the loading confirmation unit 166 displays information representing that the baggage should not be loaded on the display unit 140 (step S208), and the process returns to step S203.

However, if the baggage identification number is included in the loading target list (Yes in step S207), the loading confirmation unit 166 displays information representing that the baggage should be loaded on the display unit 140 (step S209). Further, the loading confirmation unit 166 deletes the baggage identification number from the loading target list (step S210).

If the loading target list becomes empty as a result of deletion (Yes in step S211), the loading confirmation unit 166 displays information representing that loading of the baggage 8 has been completed on the display unit 140 (step S212). At this time, when the baggage 8 remains at the collection place 4 or when information representing that loading has been completed is not displayed even though all of the baggage 8 arranged at the collection place 4 has been loaded onto the truck 7, the worker checks whether there has been no erroneous loading or erroneous arrangement.

However, if the loading target list does not become empty as a result of deletion (No in step S211), the loading confirmation unit 166 returns to step S203 and updates display of the loading target list. Thereafter, step S204 and subsequent steps are executed again.

As described above, the forklift 10 loads the baggage 8 onto the truck 7 while executing sequential confirmation, without erroneous shipment or omission of shipment, using the collected baggage identification information stored in the RFID tag 9 of the baggage 8 lastly arranged at the collection place 4. In this method, even if an information processing system that collectively manages a status of the baggage 8 is not constructed, accurate shipment management can be implemented through the forklift 10 and the RFID tag attached to each piece of the baggage 8.

Further, the configuration of the forklift 10 illustrated in FIG. 3 can be diversely modified without departing from the spirit of the invention. For example, among various functions included in the forklift 10, functions excluding a function related to physical carrying of the baggage 8 may be included in a portable terminal, and the worker may execute the baggage receiving and shipping processes while operating the portable terminal.

Further, RFID tags may be attached to both the front and the rear of each piece of baggage, and baggage arrangement management can be implemented using the two RFID tags. In this case, when newly arranging the baggage at the collection place, information that enables identification of the RFID tag attached to the front of a piece of the baggage and the RFID tags attached to the fronts of respective pieces of baggage previously placed at the collection place (for example, IDs specific to the RFID tags attached to the fronts) is recorded in the RFID tag attached to the rear of the very piece of the baggage as part of the collected baggage identification information.

Further, when generating the loading target list, information for identifying the RFID tag attached to the front of each piece of the baggage may be included in the loading target list. In this case, when performing loading in order starting from the baggage at the front, since the fork of the forklift does not pass through the opposite side of the baggage, even if information of the RFID tag at the rear of the baggage cannot be read through the antennal installed at the front of the fork, information of the RFID attached to the front of the baggage can be read, and thus the baggage can be confirmed.

Further, in this case, it is preferable that there be a correspondence between the loading target list and the baggage identification number stored in the RFID tag attached to the front of each piece of the baggage. Thus, if the same baggage identification number or the baggage identification number in which the correspondence can be confirmed is previously stored in both the RFID tag attached to the front of each baggage and the RFID tag attached to the rear thereof, when the baggage is newly arranged at the collection place, it is not necessary to record information related to the RFID tag attached to the front of the baggage in the RFID tag attached to the rear thereof as part of the collected baggage identification information.

Further, the functions of the control unit 160 of the forklift 10 may be implemented by software. An example of the configuration of the control unit 160 whose functions are implemented by software will be described.

Figure 7:
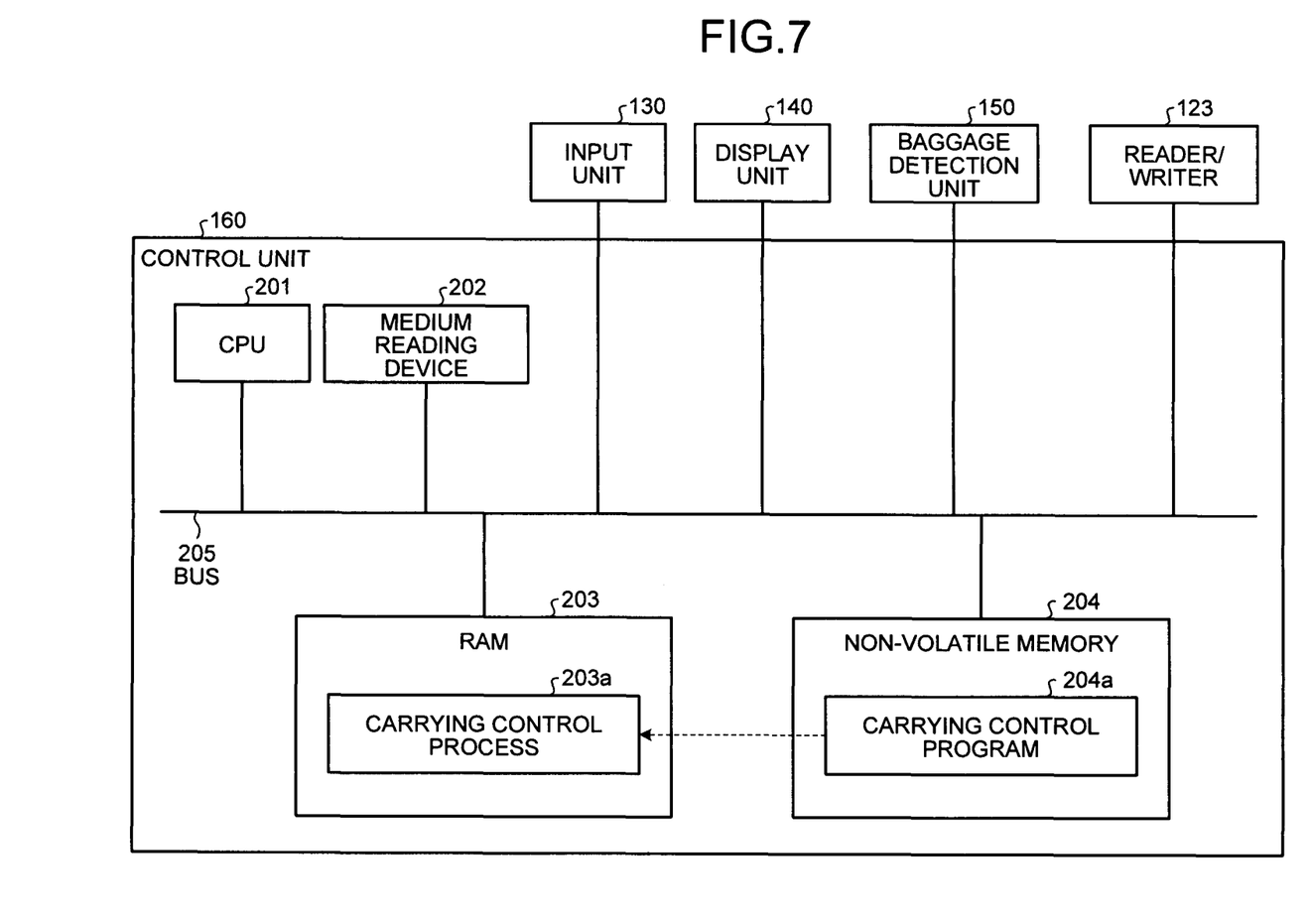
FIG. 7 is a block diagram illustrating an example of the configuration of a control unit whose functions are implemented by software.

FIG. 7 is a block diagram illustrating an example of the configuration of the control unit 160 whose functions are implemented by software. The control unit 160 includes a central processing unit (CPU) 201 that executes various calculation processes, a medium reading device 202 that reads, for example, a program from a recording medium, a random access memory (RAM) 203 that temporarily stores various information, a non-volatile memory 204 such as a flash memory, and the like which are connected to one another by a bus 205. The input unit 130, the display unit 140, the baggage detection unit 150, and the reader/writer 123 that are illustrated in FIG. 3 are also connected to the bus 205.

A carrying control program 204a that executes various functions of the control unit 160 illustrated in FIG. 3 is stored in the non-volatile memory 204. By reading the carrying control program 204a and expanding the carrying control program 204a into the RAM 203 through the CPU 201, the carrying control program functions as a carrying control process 203a. The carrying control process 203a expands data into an area, allocated to itself, on the RAM 203 and executes various data processing based on the expanded data.

Further, the carrying control program 204a needs not be necessarily stored in the non-volatile memory 204. The CPU 201 may read and execute the program stored in a storage medium such as a CD-ROM. The program may be stored in another computer (or a server), and the CPU 201 may read and execute the program via a wireless or wired network.

Further, in the above described embodiment, the baggage arrangement method according to the present embodiment has been described in connection with the case in which the baggage is flatly placed but can be applied to a case in which the baggage 8 is collected in any other form. The baggage arrangement management method according to the present embodiment is effective particularly when pieces of baggage 8 are collected in the form in which only some pieces of baggage 8 among pieces of collected baggage 8 can be accessed. However, the invention is not limited to the above purpose.

Further, in the above described embodiment, the baggage arrangement management according to the present embodiment is implemented by reading/writing information from/into the RFID tag attached to the baggage, but a tag other than the RFID tag may be used. For example, instead of the RFID tag, a magnetic storage medium, or paper label, electronic paper, or the like that can be read or written by an optical reading device or a printing device may be used.

According to an embodiment of the invention, based on information stored in the RFID tag attached to the baggage lastly arranged at the collection place, it is confirmed that the collection place is not a wrong place. Further, information of each piece of baggage collected at the collection place is cumulatively recorded in the RFID tag attached to the baggage lastly arranged at the collection place. Thus, the baggage can be arranged at a correct collection place, and the baggage arranged at the collection can be accurately grasped and managed.

Further, it is effective in resolving the above described problems to apply components of a carrying apparatus, expressions, or a combination of components disclosed in this disclosure to a method, a device, a system, a computer program, a recording medium, and a data structure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A baggage arrangement management method for managing baggage using a carrying apparatus, comprising:
   first reading collection place identification information for identifying a collection place of an arrangement destination of a first piece of baggage from a tag attached to the first piece of baggage that is baggage of an arrangement target;
   second reading collected baggage identification information and collection place identification information from a tag attached to a second piece of baggage that is a baggage lastly arranged in a collection place, the baggage identification information including baggage identification information for identifying each piece of baggage arranged in a collection place at which the second piece of baggage is arranged, the collection place identification information being for identifying the collection place at which the second piece of baggage is arranged;
   comparing the collection place identification information read at the first reading with the collection place identification information read at the second reading to confirm that the collection place of the arrangement destination of the first piece of baggage is the same as the collection place in which the second piece of baggage is arranged; and
   performing a recording process of recording collected baggage identification information read from a tag attached to the second piece of baggage in a tag attached to the first piece of baggage when it is confirmed that the collection place of the arrangement destination of the first piece of baggage is the same as the collection place in which the second piece of baggage is arranged.

2. The baggage arrangement management method according to claim 1, wherein the recording process is performed after it is detected that the first baggage has been arranged.

3. The baggage arrangement management method according to claim 1, wherein the second reading the collection place information includes reading collection place identification information for identifying the collection place from a tag attached to a label installed at the collection place when any baggage is not arranged at the collection place.

4. A carrying apparatus for carrying a baggage to arrange the baggage at a collection place, the carrying apparatus comprising:
   an arrangement target baggage information reading unit that reads collection place identification information for identifying a collection place of an arrangement destination of a first piece of baggage from a tag attached to the first piece of baggage that is baggage of an arrangement target;
   a collection place information reading unit that reads collected baggage identification information and collection place identification information from a tag attached to a second piece of baggage that is baggage lastly arranged in a collection place, the collected baggage identification information including baggage identification information for identifying each piece of baggage arranged in a collection place at which the second piece of baggage is arranged, the collection place identification information being for identifying the collection place at which the second piece of baggage is arranged;
   a collection place confirmation unit that compares the collection place identification information read by the arrangement target baggage information reading unit with the collection place identification information read by the collection place information reading unit and confirms that the collection place of the arrangement destination of the first piece of baggage is the same as the collection place in which the second piece of baggage is arranged; and
   a recording unit that records collected baggage identification information read from a tag attached to the second piece of baggage in a tag attached to the first baggage when the collection place confirmation unit confirms that the collection place of the arrangement destination of the first piece of baggage is the same as the collection place in which the second piece of baggage is arranged.

5. The carrying apparatus according to claim 4, wherein the recording unit performs the recording process after it is detected that the first baggage has been arranged.

6. The carrying apparatus according to claim 4, wherein the collection place information reading unit reads collection place identification information for identifying the collection place from a tag attached to a label installed at the collection place when any baggage is not arranged at the collection place.

7. A computer-readable, non-transitory medium storing a carrying control program for managing baggage using a carrying apparatus, the carrying control program causing a computer to execute a process comprising:
   first reading collection place identification information for identifying a collection place of an arrangement destination of a first piece of baggage from a tag attached to the first piece of baggage that is baggage of an arrangement target;

second reading collected baggage identification information and collection place identification information from a tag attached to a second piece of baggage that is a baggage lastly arranged in a collection place, the baggage identification information including baggage identification information for identifying each piece of baggage arranged in a collection place at which the second piece of baggage is arranged, the collection place identification information being for identifying the collection place at which the second piece of baggage is arranged;

comparing the collection place identification information read at the first reading with the collection place identification information read at the second reading to confirm that the collection place of the arrangement destination of the first piece of baggage is the same as the collection place in which the second piece of baggage is arranged; and performing a recording process of recording collected baggage identification information read from a tag attached to the second piece of baggage in a tag attached to the first piece of baggage when it is confirmed that the collection place of the arrangement destination of the first piece of baggage is the same as the collection place in which the second piece of baggage is arranged.

8. The computer-readable, non-transitory medium according to claim 7, wherein the recording process is performed after it is detected that the first baggage has been arranged.

9. The computer-readable, non-transitory medium according to claim 7, wherein the second reading the collection place information includes reading collection place identification information for identifying the collection place from a tag attached to a label installed at the collection place when any baggage is not arranged at the collection place.

* * * * *